US007487409B2

(12) United States Patent
Atherton et al.

(10) Patent No.: US 7,487,409 B2
(45) Date of Patent: Feb. 3, 2009

(54) APPARATUS, SYSTEM, AND METHOD FOR ACCESSING SYSTEM INFORMATION

(75) Inventors: William Edward Atherton, Hillsborough, NC (US); Fernando Aramis Lopez, Cary, NC (US); Robert Russell Wolford, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 11/216,408

(22) Filed: Aug. 31, 2005

(65) Prior Publication Data

US 2007/0050499 A1 Mar. 1, 2007

(51) Int. Cl.
*G06F 11/00* (2006.01)
(52) U.S. Cl. .......................................... 714/57; 714/46
(58) Field of Classification Search .................. 714/46, 714/57
See application file for complete search history.

(56) References Cited

U.S. PATENT DOCUMENTS

| 5,161,103 | A | | 11/1992 | Kosaka et al. ................ 364/408 |
|---|---|---|---|---|
| 5,463,764 | A | * | 10/1995 | Mueller ........................ 714/15 |
| 6,145,098 | A | | 11/2000 | Nouri et al. .................... 714/31 |
| 6,606,716 | B1 | * | 8/2003 | Vrhel et al. .................... 714/32 |
| 6,633,905 | B1 | * | 10/2003 | Anderson et al. ........... 709/219 |
| 7,000,150 | B1 | * | 2/2006 | Zunino et al. ................. 714/38 |
| 2006/0230321 | A1 | * | 10/2006 | Cummins et al. ............. 714/46 |

OTHER PUBLICATIONS

"Dynamic Persistance Inputs System Information" Google Search http://www.google.com.

* cited by examiner

*Primary Examiner*—Joshua A Lohn
(74) *Attorney, Agent, or Firm*—Kunzler & McKenzie (57) ABSTRACT

An apparatus, system, and method are disclosed for accessing system information. The apparatus includes an observation module, a monitoring module, and an action module. The observation module receives input device signals. The monitoring module recognizes selected inputs from among input data. The action module, working independently of the local system, selectively or automatically causes system information or action to be conveyed to a user.

25 Claims, 6 Drawing Sheets

APPARATUS, SYSTEM, AND METHOD FOR ACCESSING SYSTEM INFORMATION

BACKGROUND OF THE INVENTION

1. Field of the Invention

This invention relates to an apparatus, system, and method for accessing system information and more particularly relates to an apparatus, system, and method for controlling, managing, and displaying system input and output signals to give a user access to system information independent of the system's operating system.

2. Description of the Related Art

Information technology is the lifeblood of most businesses in today's world. Data is often a business' most valuable commodity. Businesses also depend heavily on executable programs to conduct their businesses. A businesses' data, information, and/or executable programs may be stored on a computer system consisting of a single personal computer, a group of networked computers or servers in one location, or multiple groups of networked computers or servers that span several locations. Regardless of the size of the computer system, computer files of every kind must be accessible to those who need them. Computer system "down time" costs companies money.

Most computer systems store information that can aid a computer tech or other user to understand the reason why a computer system is no longer responding to inputs or is otherwise functioning improperly. Other computer systems have operating systems that allow a computer tech to conduct some form of diagnostics or perform system management operations. Other computer systems include a service processor that is designed to give a user real time status of events and errors that are going on inside of the computer system.

The problem with many of these computer systems, however, is that when the computer system becomes inoperable, it is impossible to access tools needed to diagnose and/or fix the problem. In many instances, current systems require a separate machine to access the service processor on the unresponsive machine or to access other aides on the unresponsive machine. Many current systems also require a complete reboot of the machine that is unresponsive before allowing access to helpful system information regarding the reasons why the system crashed. Even in these systems, it often requires a separate machine to complete the reboot process for the unresponsive machine. In many instances, a user is dependent upon the management tools of the system that is frozen in order to find out the real time status of the unresponsive system. The user has no way to get to a system processor or service processor on the frozen machine without having to go to a separate machine.

This issue is especially problematic if you have multiple machines networked together in a single storage rack or in other limited-space situations. These types of systems are usually connected by some external connection, such as a KVM or other proprietary connection, and have a single monitor to perform management functions on, or to provide access to, the networked system. The problem, however, is that a computer tech or other user may only use the monitor to look at one of the networked systems or machines at a time. Present technology does not allow a user to simultaneously look at two systems or machines in the networked array efficiently. For example, if a user wanted to copy a file from a first machine to a second machine and then immediately run the file on the second machine as soon as the file was copied, the user would have to switch to the first machine, move the file over, then switch over to the second machine to start the desired application. In server rooms, where space is a premium, using multiple monitors to access multiple machines is not a viable solution.

From the foregoing discussion, it should be apparent that a need exists for an apparatus, system, and method that would allow access to an unresponsive computer system without having to reboot that system. It would be a further advantage to provide an apparatus, system, and method that would allow simultaneous access to multiple machines within a system. It would be a further advantage to provide an apparatus, system, and method that would allow real time access to a computer system without relying on that systems management software or hardware. It would be a further advantage to provide such a system that could provide system information on the same monitor that displays output from the main operating system, independently of the that operating system. Such an apparatus, system, and method are disclosed and claimed herein.

SUMMARY OF THE INVENTION

The present invention has been developed in response to the present state of the art, and in particular, in response to the problems and needs in the art that have not yet been fully solved by currently available apparatus, system, and method of accessing system information. Accordingly, the present invention has been developed to provide an apparatus, system, and method for accessing system information that overcome many or all of the above-discussed shortcomings in the art. The apparatus to access system information is provided with a logic unit containing a plurality of modules configured to functionally execute the necessary steps of receiving input device signals, recognizing selected inputs from among input data, and causing system information to be conveyed to a user. These modules in the described embodiments include an observation module, a monitoring module, and an action module.

The apparatus, in one embodiment, is configured to provide access to system information. The apparatus may include an observation module configured to receive input device signals. It may also include a monitoring module configured to recognize selected inputs from among input data. In one embodiment, an action module, independent of the local system, is configured to selectively cause system information to be conveyed to a user. The apparatus may be a programmable logic device.

In one embodiment, the apparatus is configured to convey system information while the local system and/or the local system's primary processor is in a state unresponsive to inputs from a user. The system information may be displayed in a data container displayed on a monitor. In one embodiment, the data container is configured to receive an input from a user.

A computing device is also presented to convey system information to a user. The computing device, in one embodiment, includes a processor, a video controller, an input controller, input devices, output devices, and a memory containing modules for video data and execution on a processor. In one embodiment, the modules include an observation module configured to receive input device signals, a monitoring module configured to recognize selected inputs from among input data and/or video data, and an action module, independent of the local system processor, configured to selectively cause system information to be conveyed to a user. In one embodiment, the computing device may include the apparatus discussed above.

A system of the present invention is also presented to convey system information to a user. The system may include a local system or processor, a remote system or processor, a video controller, an input controller, a network controller, input devices, output devices, and a memory containing modules for execution on a processor. In one embodiment, the modules include an observation module configured to receive input device signals, a monitoring module configured to recognize selected inputs from among input data, and an action module, independent of the local system, configured to selectively cause system information to be conveyed to a user.

A method of the present invention is also presented for conveying system information to a user. The method in the disclosed embodiments substantially includes the steps necessary to carry out the functions presented above with respect to the operation of the described apparatus, computing device, and system. In one embodiment, the method includes receiving input device signals, recognizing selected inputs from among input data, and selectively causing, independent of the local system, system information to be conveyed co to a user. In a further embodiment, the method includes automatically conveying the system information based upon a system event. In another embodiment, the system information is conveyed in response to a predetermined input from a user. The input device signals may include video stream data.

In one embodiment, the method is accomplished in the form of operations by a signal bearing medium tangibly embodying a program of machine-readable instructions executable by a digital processing apparatus. Various other means are also disclosed for performing the method steps, apparatus functions, computing device functions, and system functions discussed above.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
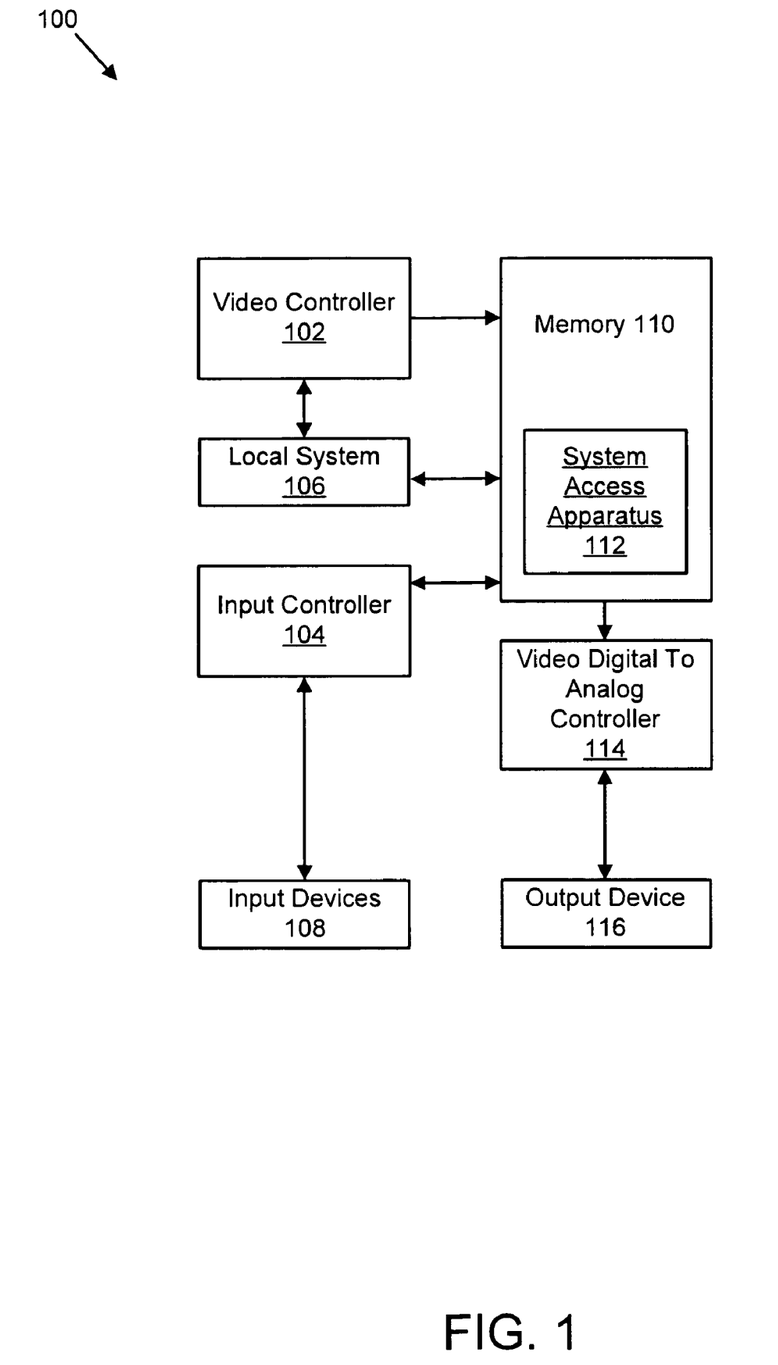
FIG. 1 is a schematic block diagram illustrating one embodiment of a computing device for conveying device information to a user in accordance with the present invention.

FIG. 1 depicts a computing device 100 according to the present invention. The computing device includes a video controller 102 and an input controller 104 in operable communication with a local system or processor 106. The processor may be a local management processor 106. In one embodiment, the video controller 102 includes an interface that is a peripheral component interconnect directly attached to the local system 106 or local processor 106. In another embodiment, the input controller 104 could be a super IO controller. In yet another embodiment, the input controller 104 is a universal serial bus (USB) host controller. It will be appreciated by those of skill in the art that the controllers 102 and 104 can connect to the local system 106 in a variety of ways, including, but not limited to a PCI bus, a proprietary bus, a hyper transport bus, and the like. It will further be appreciated that the choice of controllers 102 and 104 may depend upon the choice of input devices 108 that interact with the controllers 102 and 104.

In one embodiment, input devices 108 such as a keyboard, a mouse, a touch screen, a microphone, a USB device, and the like, communicate with the input controller 104. The computing device 100 also includes a memory 110. The memory 1110 may be shared video/management memory 110. In one embodiment, the memory 110 includes a system access apparatus 112. The memory may include modules that form the system access apparatus 112, and that are executable on the local system 106.

The system access apparatus 112 may be represented as one or more modules for executing code to allow a user access to the information regarding one or more aspects of the computing device. As will be discussed in greater detail below, these modules may include an observation module, a monitoring module, and an action module. The action module may function independently of the local system 106 to selectively cause system information to be conveyed to a user As used throughout this specification, "system information" may generally include without limitation, management processor information, operating system information, service processor or other processor information, information regarding software, firmware, or hardware residing on, or working in connection with, the computing device or devices, information regarding software, firmware, or hardware residing on, or working in connection with a larger system, diagnostic information, status information regarding one or more components, and the like. As will be discussed in greater detail below, system information may also include a command prompt, other prompts, or other types of access that allow a user to interact with the apparatus, device, or system.

The video controller 102 and input controller 104 communicate with the system access apparatus 112. In one embodiment, the system access apparatus 112 receives inputs from the video controller 102 and the input controller 104 and outputs system information in the form of a video digital signal. The system access apparatus 112 may send the digital signal to a video digital to analog controller 114 for output to an output device 116, such as a monitor 116. In one embodiment, the digital to analog controller 114 outputs the signal in an analog format that a standard red/green/blue (RGB) monitor can understand. It will be appreciated by those of skill in the art that if the output device is digital, a conversion controller 114 may not be necessary. It will further be appreciated that system access apparatus 112 may be configured to receive and output both analog and digital signals. Additionally, it will be appreciated by those of skill in the art that the controllers 102, 104, and 114, along with other components, may reside in the memory 110.

Figure 2:
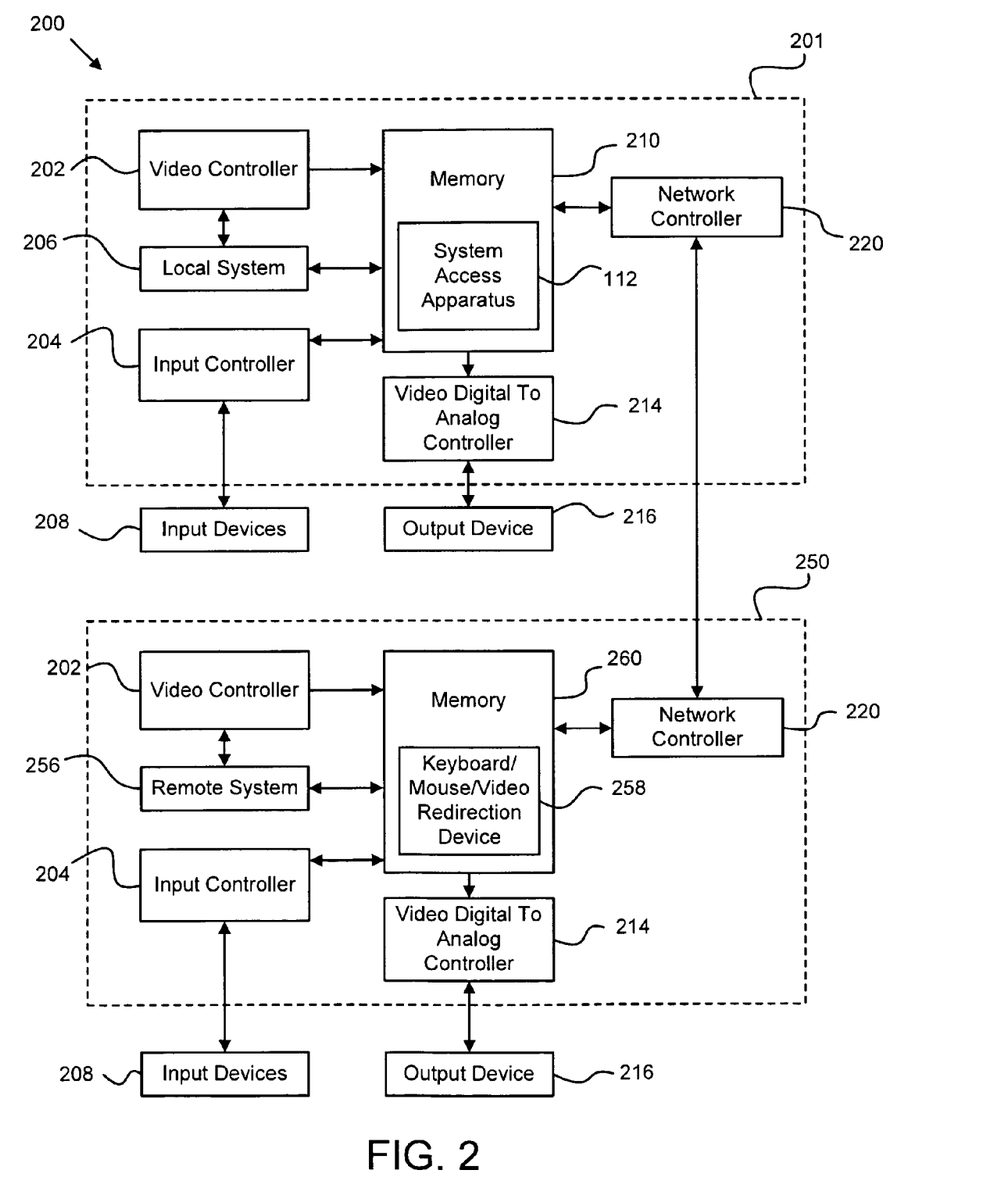
FIG. 2 is a schematic block diagram illustrating one embodiment of a system for conveying computer system information to a user in accordance with the present invention.

FIG. 2 illustrates a system 200 for allowing access to system information according to the present invention. The system 200 includes a local system 206 and one or more remote processors 256. The remote processors 256 may be management processors 256. In one embodiment, the local processor 206 is embodied in a local computing device 201 and the remote processors 256 are embodied in a remote computing device 250.

The local device 201 may, in one embodiment, be configured substantially the same as the computing device embodiment illustrated in FIG. 1. The local computing device 201 includes a video controller 202 and an input controller 204 in operable communication with the processor 206. Input devices 208 such as a keyboard, a mouse, a touch screen, a microphone, and the like, communicate with the input controller 204. The local computing device 201 also includes a memory 210. The memory 210 may be shared video/management memory 210. In one embodiment, the memory 210 includes the system access apparatus 112 of the computing device 100.

As with the computing device 100, the video controller 202 and input controller 204 of the local system 201 communicate with the system access apparatus 112. In one embodiment, the system access apparatus 112 receives inputs from the video controller 202 and the input controller 204 and outputs system information in the form of a video digital signal. The system access apparatus 112 may send the digital signal to a video digital to analog controller 214 for output to an output device 216, such as a monitor 216. As with the computing device 100, the controllers 202, 204, and 214, along with other components, may reside in the memory 210.

The remote computing device 250, in one embodiment, may also include a video controller 202 and an input controller 204 in operable communication with its processor 256. Input devices 208 such as a keyboard, a mouse, a touch screen, a microphone, and the like, communicate with, and send input signals to, the input controller 204. The remote system 250 may also include a memory 260. In one embodiment, the memory 260 includes a keyboard/mouse/video redirection device 258. The video controller 202 and input controller 204 of the remote computing device 250 communicate with the keyboard/mouse/video redirection device 258. In one embodiment, the keyboard/mouse/video redirection device 258 receives inputs from the video controller 202 and the input controller 204 of the remote computing device 250 and outputs system information in the form of a video digital signal. The keyboard/mouse/video redirection device 258 may send the digital signal to a video digital to analog controller 214 for output to an output device 216, such as a monitor. As with the local computing device 201 the controllers 202, 204, and 214, along with other components, may reside in the memory 260 or shared system/management memory 260.

The local computing device 201 and remote computing device 250 of the system 200 each include a network controller 220 to allow the computing devices 201 and 250 to communicate with each other across a network. In one embodiment, the network is an Internet. In other embodiments, the network may include without limitation, a local area network, a wide area network, an intranet, and Ethernet, and the like. In one embodiment, the system access apparatus 112 receives the data from the input devices and converts it, or packages it, in a data packet based on the network over which it will be sent. The remote computing 250 receives it through its network controller 220.

In one embodiment, the data is compressed and the remote system 250 decompresses it. In another embodiment, the remote system 250 may need to convert, or otherwise alter, the data received from the local system 201. The remote system 250 takes the data and presents it to its monitor such that the video of the remote system 250 appears as if it were the video of the local system 201. Similarly, the system access apparatus 112 can receive input data from the remote system 250 and display it to the output device 216 of the local system 201, such that video outputs seen on the remote system 250 are also seen on the local system 201.

Figure 3:
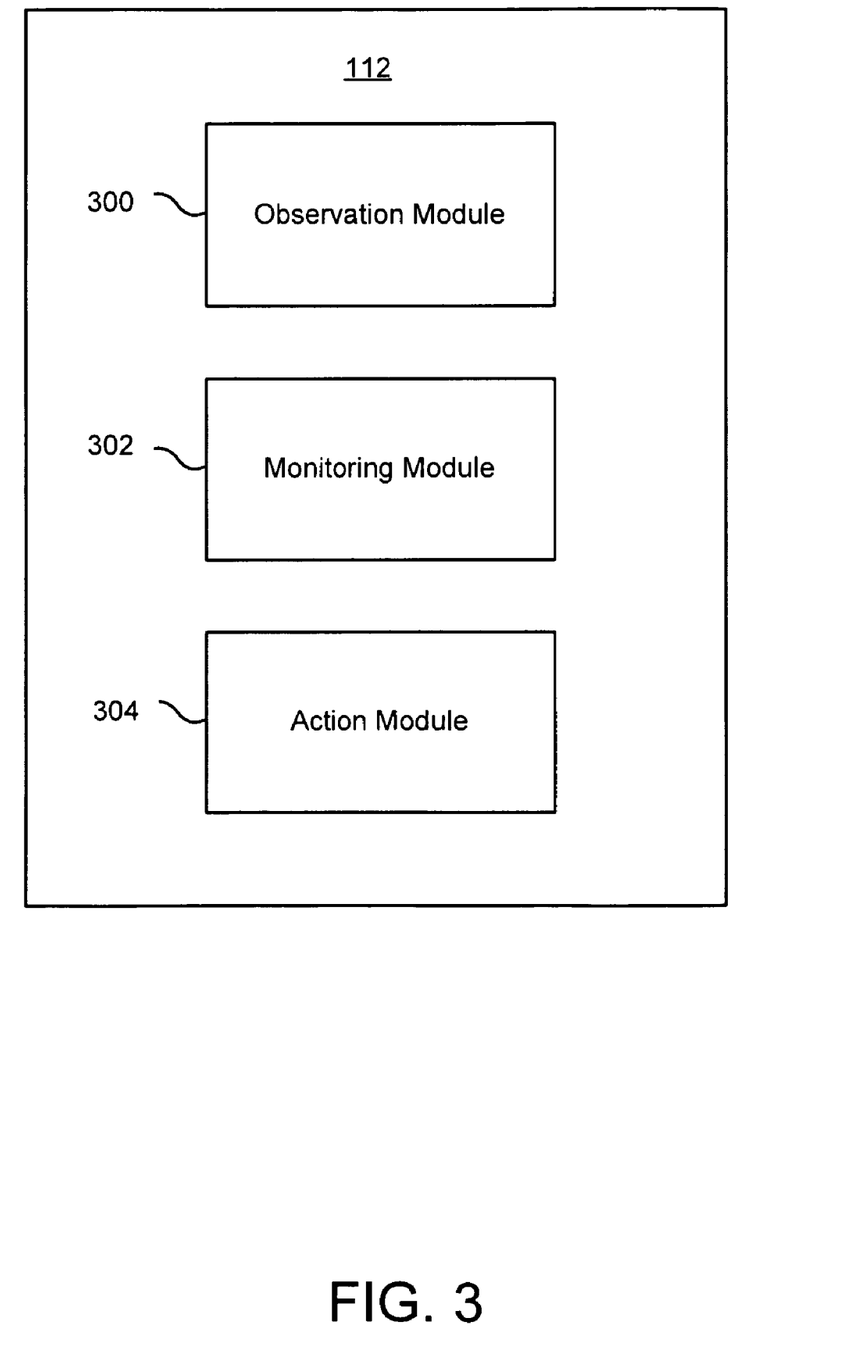
FIG. 3 is a schematic block diagram illustrating one embodiment of an apparatus for conveying computer system information to a user in accordance with the present invention.

FIG. 3 illustrates the system access apparatus 112 according to the present invention. As discussed above, the system access apparatus 112 may be embodied as part of a computing device 100 or as part of a larger system 200 having local and remote components. The system access apparatus 112 may also be a stand-alone unit. In one embodiment, the apparatus 112 includes an observation module 300 configured to receive input device signals. These input device signals may, without limitation, be generated by a keyboard, a mouse, a touch pad, a screen, a microphone, and the like. The observation module 300 allows the apparatus 112 to intercept inputs from the input devices 116 before they are received by the regular system processor. The observation module 300 as described herein is one example of means for observing input device signals.

The system access apparatus 112, may also include a monitoring module 302 configured to recognize selected inputs from among input data. In one embodiment, the input data may be generated by a user. In another embodiment, the input data may be generated by a computer or larger system. The monitoring module 302 may be configured to recognize, without limitation, certain keystroke commands, certain voice commands, the passing of the mouse pointer over a certain screen location, various click or keystroke patterns, and the like. The monitoring module 302, as described herein is an example of means for recognizing selected inputs from among input data.

The system access apparatus 112 also includes an action module 304. The action module 304 may be configured to selectively cause system information to be conveyed to a user, independently of the system processor. For example, in the embodiment illustrated in FIG. 1, the action module 304 of the system access apparatus 112 could convey system information regardless of whether the processor 106 was functioning, hung up, or otherwise not responding. Conveying system information independent of the system processor also includes conveying system information independent of programs executed by the system processor. In one embodiment, the action module 304 selectively conveys system information to a user independent of the computer's, or larger system's, operating system. Because the apparatus 112 has access to the shared video memory unit, it can overlay system information in the form of management data on the video stream and display it on a monitor or stream it through a network to a remote processor or system. With the modules 300, 302, and 304 allow the apparatus 112 to monitor, modify, and/or control the data video management input unified memory unit 110, 210, and 260. Thus, even if the operating system is unresponsive, the action module 304, of the present invention can convey system information to a user or otherwise allow a user to access the system.

For example, a computer system 100 may have access to service processors that reside in one or more servers. These service processors may be designed to provide the real-time status of a variety of events or actions being performed with the system. The apparatus 112 may provide system information in the form of a status report to a user regarding point of failure analysis.

In one embodiment, the action module 304 receives an input signal, including video signals, modifies the signal, and then redisplays it to the monitor 116. The action module 304, as described herein, is an example of means for selectively causing system information to be conveyed to a user independent of a system's operating system.

The observation and monitoring modules 300 and 302 act as a buffer to capture inputs from the input devices 108. In one embodiment, the apparatus 112 controls all of the traffic on the video, or video frame buffer, on the keyboard and the mouse. As will be discussed in greater detail below, the action module 304 of the apparatus 112 conveys system information to a user by opening a container, screen, or window to provide system management or other access or interaction. The apparatus 112 can overlay the container or window on top of the system's regular video output. The apparatus 112, because it controls and buffers the inputs, also can resize, reposition, reconfigure, or add content to the system's regular video output. In the event of a system hang-up, because the apparatus 112 has captured or buffered the inputs from the system's input devices 108, the action module 304 of the apparatus 112 can overlay one or more access container over the frozen screen. The apparatus 112 can also resize the frozen "blue screen" and present containers or windows along side the resized frozen screen. The apparatus 112 then provides the user with mouse, keyboard, or other control over that particular container or window.

For example, when a system is unresponsive, the action module 304 allows a user to open a container or screen, and the user could call up and look at the system information, or the service processor information, or start a test on the hard drive or on memory. The apparatus 112 also allows a user to open a container wherein the user could reboot the system. In another embodiment, a user could capture a frozen screen from an unresponsive system, open a container, and use the container to email a picture of the frozen screen to a computer technician.

In one embodiment, the apparatus 112 hardware is laid out with dynamic persistence with input (DPI) technology such that keyboard, mouse, or other input signals are received before they are passed through to the main operating system. Accordingly, the apparatus 112 can send system information, or otherwise open access containers or windows when the operating system has hung up, or in response to an error message or condition. Because the input signals are captured, and the output is not dependent upon the systems operating system or processor, access containers can be automatically or manually opened based upon a variety of events. Accordingly, system information can be conveyed while the system's primary processor is in a state unresponsive to inputs from a user.

In one embodiment, the system information conveyed is from a service processor. In another embodiment, the system information conveyed is from the system's microprocessor. In yet another embodiment, the system information conveyed could be from a base management controller system. As discussed above, the apparatus 112 can provide access, via a container presented to an output device 116, to any diagnostic or management information relating to the system.

It will be appreciated by those of skill in the art that when the apparatus 112 is attached, networked, or otherwise linked to other computers or machines, the system information conveyed could be from those other computers or machines. Accordingly, the apparatus 112 can convey system information to or from a remote system 250. For example, in an embodiment where the apparatus 112 is located in a first computing device 201 and is linked to a second computing device 250, a user may initiate a keystroke sequence on the first computing device 201. That sequence may convey system information to a monitor 116 in the form of a container. The contents of that container may request an action from a user. In response to the request, the user may enter a command such as "Remote connection." In one embodiment, the user may enter the Internet Protocol information for the second computing device 250 and the user's credentials.

The command would then go out over the connection coupling the first computing device 201 and the second computing device 250 and establish a connection with the second computing device 250. It will be appreciated by those of skill in the art that this connection could be any of a variety of connections, including, but not limited to an Ethernet, a local area network, a wide area network, an Internet, a wireless network, a Bluetooth connection and the like. The apparatus 112 on the first computing device 201 would then be able to receive video information from the second computing device 250. In one embodiment, the second computing device 250 would have to give the first computing device 201 permission before accessing the video displayed on the second computing device 250. In this example, the second computing device 250 would see the regular video being output from its operating system. The first computing device 201, could have multiple containers or windows, one of which displays the regular video produced by the processor on the first computing device 201, and the other that displays the video from the second computing device 250.

In one embodiment, a first and a second computing device linked together by a communication link each contain an apparatus 112. In this embodiment, each of the devices would have access to the video of the other device. It will be appreciated by those of skill in the art that by intercepting the input signals, the apparatus 112 in one of the computing devices also gives control of the keyboard, mouse, and other inputs on that device to the other computing device. This would allow a first computing device to control the inputs given in the second computing device. For example, if a first user is working on a computing device at home and has a question regarding how to start an application on that first computing device, a second user could open a container on a second computing device that would display the video of the first computing device. The second user could then move a mouse or press keys on the second computing device that the first user would see on the first computing device. The second user could show the first user where to move the mouse and what to input to launch the desired application.

In one embodiment, system information is conveyed to an output device 116 automatically. This may occur upon the existence of an event such as a transfer request, a blue screen, an error message, a time stamp, a signal from an input device, a signal from a local or remote processor or machine, and the like. For example, in an embodiment where the computing device 100 or larger system 200 includes a service processor, the triggering "event" may be that the service processor recognizes that the operating system has stopped responding. In another embodiment that includes a service processor, the service processor may include a "watch dog" timer. A container giving a user access to system information could be conveyed to an output device 116, such as the monitor. In one embodiment, the container could automatically open a service processor diagnostics window, a system management window, and the like.

In one embodiment, system information is presented in the form of a prompt which allows a user to select an action such as opening up a separate container, opening up a management tool window or container, opening a container that shows diagnostics, opening up a container with the video output from a remote machine, a combination of foregoing, and the like. Accordingly, in one embodiment, the container is interactive and can request and receive inputs from a user. It will be appreciated by those of skill in the art that system information could be conveyed to an output device 116 in a variety of ways configurable by a user.

In another embodiment, system information is conveyed in response to a predetermined input from a user. In one embodiment, the apparatus 112 could be originally configured to recognize a key sequence or combination of keystrokes or mouse movements that would allow a user to gain access to a system information container, whether interactive or not, whenever they wanted to. For example, if a user wanted to open a container to gain access to system information, it could be done through a predetermined "hot key" such as pressing <escape>, or <alt> <tab>. In another example, a "right click" or a "left click" with the cursor in a certain predetermined location on the screen could bring up a system information container.

In one embodiment, the apparatus 112 is a computer chip on a personal computer. In other embodiments, the apparatus 112 is located on a machine that is part of a network. In a configuration where one or more processors or machines are networked together, the apparatus 112, can display information pertaining to any of the networked machines or systems on any of the machines or systems.

The apparatus 112 may be a programmable logic device. The apparatus 112 may be configured as a field programmable gateway array. In other embodiments, the apparatus 112 could be embodied as hardware, firmware, software, or a combination of these. It will be also appreciated by those of skill in the art that the apparatus 112 could be configured such that special software is not needed to practice the teachings of the invention. In one embodiment, the apparatus is built into the hardware of the computing device 100 or larger system 200. The apparatus 112 can communicate with the computing device 100 and/or system 200. The apparatus 112 passes inputs such as keystrokes, mouse movements, and the like, which the operating system of the computing device 100 and/or system 200 interprets. The logic of the apparatus 112 is independent of the logic running the computing device 100 and/or system 200. The inputs are intercepted, captured, or otherwise buffered in the apparatus 112 before they are recognized and formatted by the local operating systems of the computing apparatus 100 or system 200.

FIGS. 1-3 are block diagrams of three exemplary systems that provide points of discussion for the present invention. However, the present invention is not limited to any particular physical organization of the components shown in these figures. Those of skill in the art will recognize that these basic components are subject to a wide-range of embodiments, including a single physical device or several physical devices. Therefore, FIGS. 1-3, and all other figures, should be viewed as exemplary of embodiments according to the present invention, rather than as restrictions on the present invention's scope.

Figure 4A:
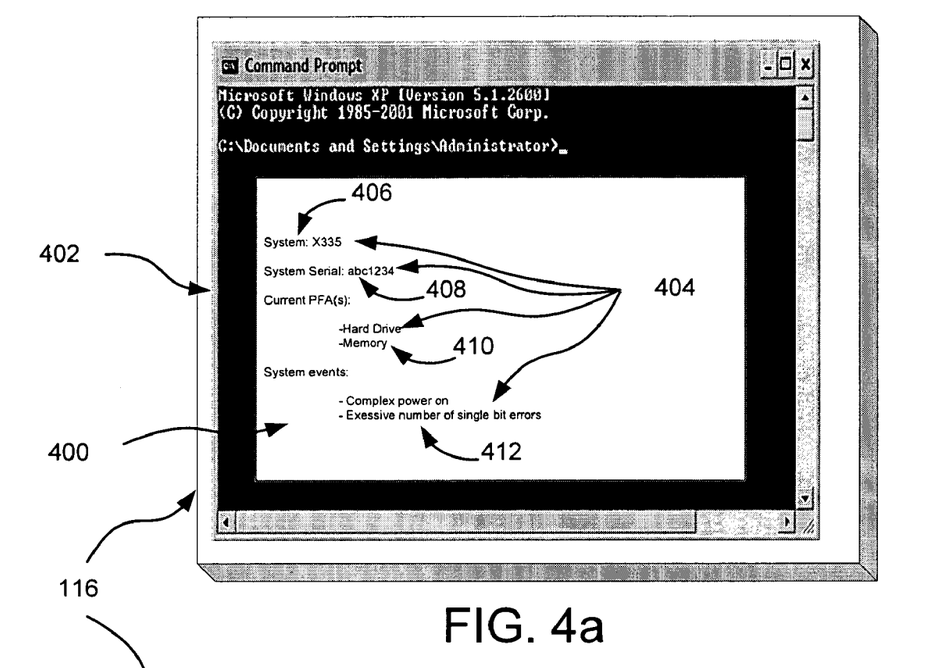
FIG. 4a is an illustration of one embodiment an of output from the apparatus, device or system of FIGS. 1-3.
Figure 4B:
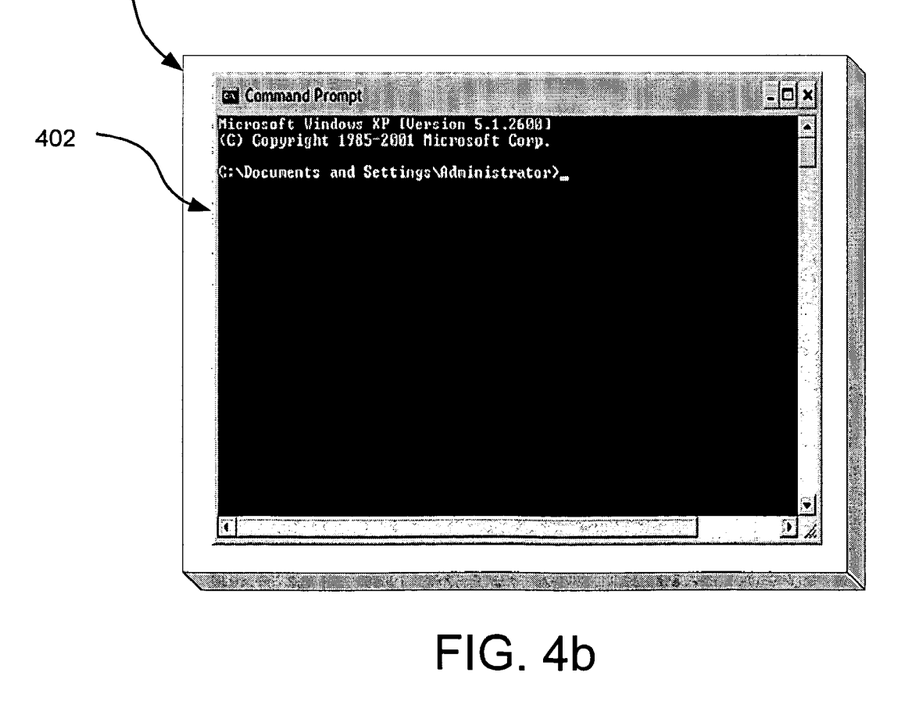
FIG. 4b is an illustration of one embodiment of an output from the apparatus, device or system of FIGS. 1-3.

Referring now to FIGS. 4a-b, one embodiment of an output device 116 is shown. The action module 304 is configured to display at least one data container 400 on a monitor. In one embodiment, illustrated in FIG. 4a, at least one data container 400 is displayed on top of the video output 402 generated by the system's main operating system. The data container 400 is configured to display system information 404, which in the illustrated embodiment includes a system name 406, a system serial number 408, a point of failure analysis ("PFA") 410, and system events 412.

As discussed above, in one embodiment, the opening of a container 400 is possible, because the hardware of the apparatus 112 is independent of the system's processor and/or operating system and captures triggering inputs before the normal system hardware does. Thus, if the system is locked up, or if it is not, inputs are processed by the apparatus 112 before they are processed by the system's own processors. In one embodiment, when the apparatus 112 opens a container 400 it is because the apparatus 112 wants to communicate with a user independently of the main system.

Accordingly, using this approach the apparatus 112 does not need the main operating system to handle the video system. The apparatus 112 can allocate the video system dynamically to have one or more containers or access sessions open on a single monitor 116 that the apparatus 112 can dynamically resize. In one embodiment, the apparatus 112 manipulates the video frame buffer. For example, the apparatus 112 controls the video frame buffer in such a way that the apparatus 112 can display or overlay service processor data on top of the main operating system output.

In another example, the apparatus 112 is able to manipulate the video frame buffer so that it displays information and gives a user access to the service processor to allow a user to perform a system restart, a system shut down, an error data collection through the service processor, or otherwise obtain access to system information. Thus, the apparatus 112 provides the advantage that it only needs one video display while being able to present multiple containers 400 with different types of information on it.

In the embodiment illustrated in FIG. 4b, input signals are passed from the apparatus 112 to the system's regular operating system or main processor and the system's normal video output 402 is displayed. In the illustrated embodiment, a DOS video output showing a DOS prompt is displayed. In other embodiments it could be a Windows® output or other operating system output. The apparatus 112 may determine to simply buffer the input signals as it receives them and pass them on, without intervention, to be processed by the operating system. For example, if there is no triggering event that would cause the apparatus 112 to open a container or otherwise prevent system information independent from the main processor, the apparatus 112 will simply pass along the inputs it receives. Accordingly, the apparatus 112 selectively conveys system information 404 to a user.

Figure 5A:
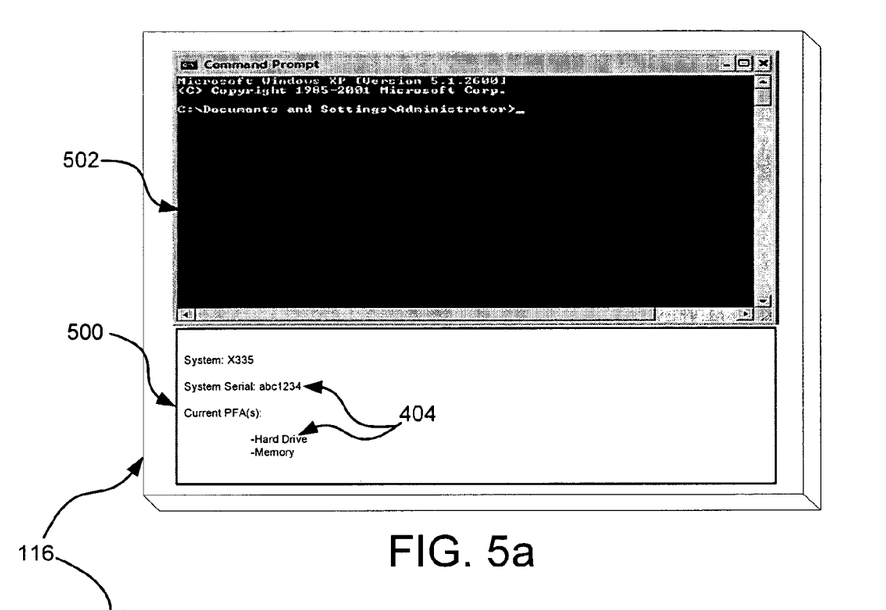
FIG. 5a is an illustration of one embodiment of output from the apparatus, device or system of FIGS. 1-3.
Figure 5B:
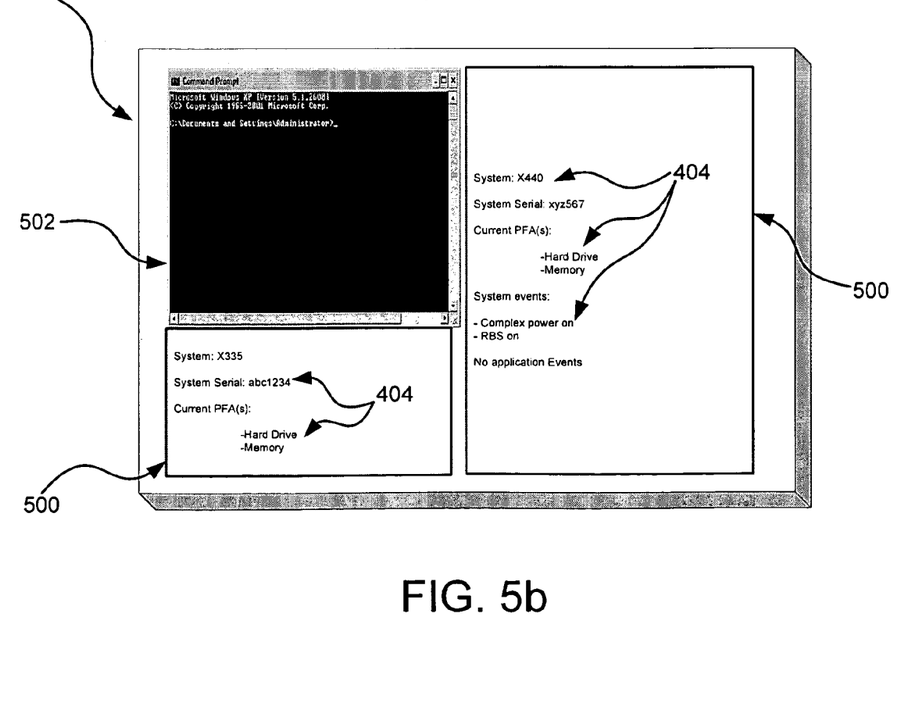
FIG. 5b is an illustration of one embodiment of output from the apparatus, device or system of FIGS. 1-3.

Referring now to FIGS. 5a and 5b, the output devices 116 illustrate multiple containers 500. As discussed above, each container 500 may include system information 404 from local and/or remote systems. They may contain information 404 regarding local and/or remote service processors, main processors, diagnostics, and the like. The apparatus 112 may reshape or resize the containers 500 and/or the normal video output 502.

In one embodiment, the data containers 500 are configured to receive an input. For example, in one embodiment, a user may type some input that is recognizable to the apparatus 112. The apparatus may open a container 500 that is interactive and can accept commands or show other system information 404. The interactive container 500 may be superimposed as in FIG. 4a, or in separately resized container 500 as in FIGS. 5a and 5b. In one embodiment, the newly opened container may provide system information 404 in the form of a menu or number of choices for a user such as "new container, system management," or "remote" or "service processor" which could open up a container 500 containing the desired system information 404. In one embodiment, the keystrokes, mouse movements, or other inputs, whether manual or automatic, that open a system information or access container 500, are user-configurable. It will be appreciated by those of skill in the art that a variety of ways could be implemented to cause a system access or information screen or container 500 to appear.

In the multiple container 500 examples illustrated in FIGS. 5a and 5b, there are multiple ways to switch or transfer control between containers 500. In one embodiment, transfers of control may occur by analyzing mouse position relative to the open container 500. In another embodiment, a keystroke command such as the <tab> key may transfer control sequentially between open containers 500. It will be appreciated by those of skill in the art that there a many ways in which control over one or more containers 500 may be transferred.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
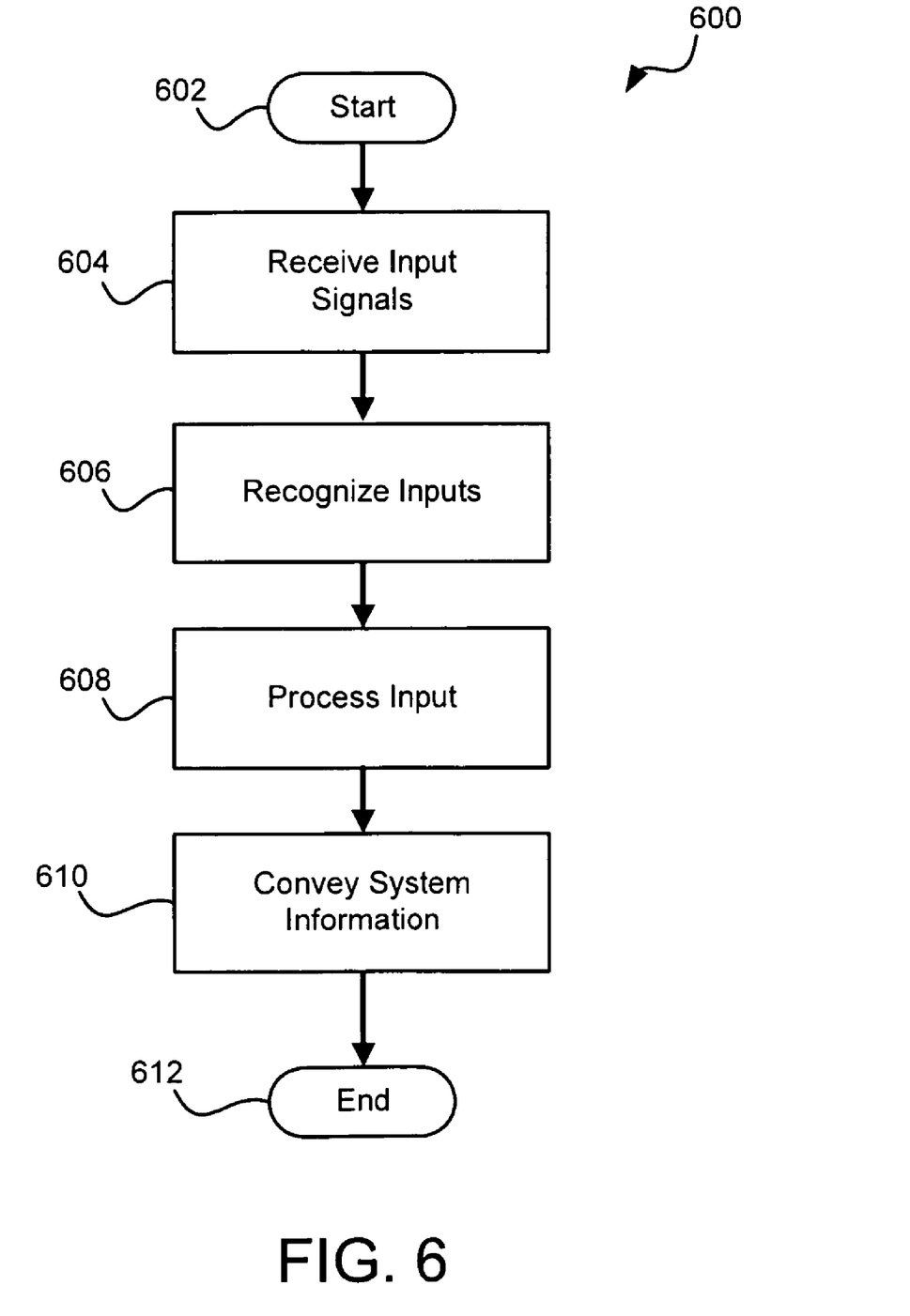
FIG. 6 is a schematic flow chart diagram illustrating one embodiment of a method for conveying system information that may be implemented on the apparatus, device or system of FIGS. 1-3.

Referring now to FIG. 6, a flow chart according to the present invention is shown. After the start 602 of the method 600, input device signals are received 604 by the observation module 300 of the apparatus 112. Selected inputs are recognized 606 by the monitoring module 302 of the apparatus 112. The action module 304 processes 608 and selectively conveys 610 system information 404 to a user and the method ends 612.

In one embodiment, the system information 404 is conveyed 610 automatically, and may be based upon an internal event, such as a transfer request, a time stamp, the occurrence of predetermined text, and the like. The system information 404 could also be conveyed 610 automatically based upon an external event such as a blue screen, an error message, and system failure, and the like. The system information 404 may also be conveyed 610 manually in response to a predetermined input from a user, such as a key stroke, a mouse click, a touch pad or screen, a microphone, and the like. The system information 404 could be conveyed 610 from a processor, base management system, a service processor, a system's microprocessor and the like.

As noted above, the system information 404 conveyed 610 could be from the local system or from a connected remote system. The system information 404 could also be conveyed 610 to a local or remote system. In one embodiment, the system information is conveyed 610 while the system's primary processor is in a state unresponsive to inputs from a user.

The system information 404 may be conveyed 610 in the form of one or more data containers 400, 500 on a monitor. These data containers 400, 500 may be configured to receive an input, such that the data containers 400, 500 are interactive. The data containers 400, 500 may also be displayed over the top of video output generated by the system's operating system. For example, if the operating system is executing a movie program to play a DVD to the monitor 116, the central processing unit (CPU) is sending data to the video controller 102. The video controller 102 sends that data out to the video memory, which in one embodiment, is shared with the apparatus 112. The apparatus 112 recognizes that the data is generated by the movie program running on the CPU and is sent under control of the main operating system. The apparatus 112 takes the data and sends the data out to the video digital to analog controller 114, which converts the data from digital to analog for display on the monitor 116.

One advantage of the apparatus 112 of the present invention is that while the apparatus 112 is handling the digital video data generated by the movie program, the apparatus 112 is also receiving 604 and monitoring other input signals. The apparatus 112 may recognize 606 a keystroke sequence that corresponds to a system management request. The apparatus 112 processes 608 the recognized keystroke trigger and causes a container 400, 500 to open on the monitor 116. Open the container 400 over the top of the output generated by the regular operating system. The action module 304 of the apparatus 112 may also resize two containers 500 to fit side by side on the monitor 116. In one container 500, the apparatus 112 sends the movie program data that is coming from the regular operating system. In the other container 500, the apparatus 112 conveys 610 system information 404 in the form of a video signal generated by the system management program sent through video digital to analog controller 114 to the monitor 116.

If a remote system 250 wanted the movie program video data from a local system 201, the apparatus 112 in the local system 201 would output the movie program data and system management data to the local monitor 116 and to the remote monitor 216 by way of the network controller 220.

In one embodiment, the above-described method is accomplished in the form of operations by a signal bearing medium tangibly embodying a program of machine-readable instructions executable by a digital processing apparatus. In one embodiment, a computer program product includes or tangibly embodies a computer readable medium having computer usable program code for facilitating the access of system information. The computer program product includes computer usable program code to implement the method described above. The method and corresponding program code may also include the steps necessary to carry out the function of the modules described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus to provide access to system information, the apparatus comprising:
   an observation module that intercepts one or more input device signals sent to a local system from one or more input devices, buffers the one or more input device signals, and passes the one or more input device signals on to the local system, the local system comprising at least a processor;
   a monitoring module that recognizes selected inputs from among the input device signals; and
   an action module that
      intercepts video signals of an image for an output display, buffers the video signals, and passes the video signals to the output display; and
      in response to a triggering event, modifies the video signals prior to passing the video signals to the output display, wherein the video signals are modified to one or more of display system information along with at least a portion of the image and to display a prompt to provide access to system information with at least a portion of the image, and wherein the system information is accessible independent of one or more of the processor and an operating system executing on the processor.

2. The apparatus of claim 1, wherein the apparatus comprises a programmable logic device.

3. The apparatus of claim 1, wherein the triggering event comprises one or more of a selected input, the processor being unresponsive, the image comprising a single uniform color, and the image being frozen.

4. The apparatus of claim 1, wherein the system information is conveyed in response to a predetermined input from a user, the input comprising the selected input.

5. The apparatus of claim 1, wherein the system information conveyed is from a service processor.

6. The apparatus of claim 1, wherein the system information conveyed is from the system's microprocessor.

7. The apparatus of claim 1, wherein the system information conveyed is from a remote system.

8. The apparatus of claim 1, wherein the system information is conveyed to a remote system.

9. The apparatus of claim 1, wherein the system information is one or more of displayed next to the image, displayed over top of a portion of the image, and displayed in place of the image.

10. The apparatus of claim 1, wherein the action module is further configured to display at least one data container on a monitor, wherein the monitor comprises the output display, a data container comprising at least one of the image and system information.

11. The apparatus of claim 10, wherein the data container is configured to receive an input.

12. The apparatus of claim 10, wherein at least one data container is displayed on top of the video output generated by the system's operating system.

13. A computing device to allow access to system information, the computing device comprising:

a processor;
a video controller;
an input controller;
one or more input devices;
one or more output devices; and
a memory containing modules for execution on a processor, the modules comprising:
   an observation module that intercepts one or more input device signals from the input controller sent to a local system from the one or more input devices, buffers the one or more input device signals, and passes the one or more input device signals on to the local system, the local system comprising at least a processor;
   a monitoring module that recognizes selected inputs from among the input device signals; and
   an action module that
      intercepts video signals of an image for an output display controlled by the video controller, buffers the video signals, and passes the video signals to the output display through the video controller; and
      in response to a triggering event, modifies the video signals prior to passing the video signals to the output display, wherein the video signals are modified to one or more of display system information along with at least a portion of the image and to display a prompt to provide access to system information with at least a portion of the image, and wherein the system information is accessible independent of one or more of the processor and an operating system executing on the processor.

14. A system for allowing access to system information, the system comprising:
a local processor;
a remote processor;
a video controller;
an input controller;
a network controller;
one or more input devices;
one or more output devices; and
a memory containing modules for execution on a processor, the modules comprising:
   an observation module that intercepts one or more input device signals from the input controller sent to a local system from the one or more input devices, buffers the one or more input device signals, and passes the one or more input device signals on to the local system, the local system comprising at least a processor;
   a monitoring module that recognizes selected inputs from among the input device signals (user or system); and
   an action module that,
      intercepts video signals of an image for an output display controlled by the video controller, buffers the video signals, and passes the video signals to the output display through the video controller; and
      in response to a triggering event, modifies the video signals prior to passing the video signals to the output display, wherein the video signals are modified to one or more of display system information along with at least a portion of the image and to display a prompt to provide access to system information with at least a portion of the image, and wherein the system information is accessible independent of one or more of the processor and an operating system executing on the processor.

15. A computer readable storage medium tangibly embodying a program of machine-readable instructions executable by a digital processing apparatus to perform an operation to access system information, the operation comprising:
   intercepting one or more input device signals sent to a local system from one or more input devices, buffering the one or more input device signals, and passing the one or more input device signals on to the local system, the local system comprising at least a processor;
   recognizing selected inputs from among the input device signals; and
   intercepting video signals of an image for an output display, buffering the video signals, and passing the video signals to the output display; and
   in response to a triggering event, modifying the video signals prior to passing the video signals to the output display, wherein the video signals are modified to one or more of display system information along with at least a portion of the image and to display a prompt to provide access to system information with at least a portion of the image, and wherein the system information is accessible independent of one or more of the processor and an operating system executing on the processor.

16. The computer readable medium of claim 15, wherein the triggering event comprises one or more of a selected input, the processor being unresponsive, the image comprising a single uniform color, and the image being frozen.

17. The computer readable medium of claim 15, wherein the system information is conveyed in response to a predetermined input from a user, the input comprising the selected input.

18. The computer readable medium of claim 15, wherein the system information conveyed is from a processor.

19. The computer readable medium of claim 15, wherein the system information conveyed is from a remote system.

20. The computer readable medium of claim 15, wherein the system information is conveyed to a remote system.

21. The computer readable medium of claim 15, wherein the system information is one or more of displayed next to the image, displayed over top of a portion of the image, and displayed in place of the image.

22. The computer readable medium of claim 15, wherein modifying the video signals further comprises displaying at least one data container on a monitor, wherein the monitor comprises the output display, a data container comprising at least one of the image and system information.

23. The computer readable medium of claim 22, wherein the data container is configured to receive an input.

24. The computer readable medium of claim 22, wherein at least one data container is displayed on top of the video output generated by an operating system of the local system.

25. An apparatus to access system information, the apparatus comprising:
   means for observing one or more input device signals sent to a local system from one or more input devices, buffers the one or more input device signals, and passes the one or more input device signals on to the local system, the local system comprising at least a processor;
   means for recognizing selected inputs from among the input device signals (user or system); and
   means for selectively
      intercepting video signals of an image for an output display, buffering the video signals, and passing the video signals to the output display; and
      in response to a triggering event, modifying the video signals prior to passing the video signals to the output display, wherein the video signals are modified to one or more of display system information along with at least a portion of the image and to display a prompt to provide access to system information with at least a portion of the image, and wherein the system information is accessible independent of one or more of the processor and an operating system executing on the processor.

* * * * *